(12) United States Patent
Buis et al.

(10) Patent No.: US 11,068,892 B2
(45) Date of Patent: Jul. 20, 2021

(54) SYSTEM AND METHOD FOR SECURE PERSONAL INFORMATION RETRIEVAL

(71) Applicant: Samsung Electronics Co., Ltd, Suwon-si (KR)

(72) Inventors: Robert Willem Laurens Buis, Mountain View, CA (US); Mahesh Kulkarni, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 478 days.

(21) Appl. No.: 15/415,845

(22) Filed: Jan. 25, 2017

(65) Prior Publication Data
US 2018/0211258 A1    Jul. 26, 2018

(51) Int. Cl.
| | | |
|---|---|---|
| *G06Q 20/12* | (2012.01) | |
| *G06Q 20/40* | (2012.01) | |
| *G06Q 20/22* | (2012.01) | |
| *G06F 40/174* | (2020.01) | |
| *H04L 9/32* | (2006.01) | |

(52) U.S. Cl.
CPC ....... *G06Q 20/40145* (2013.01); *G06Q 20/12* (2013.01); *G06Q 20/227* (2013.01); *G06Q 20/409* (2013.01); *G06F 40/174* (2020.01); *H04L 9/3231* (2013.01)

(58) Field of Classification Search
None
See application file for complete search history.

(56) References Cited

U.S. PATENT DOCUMENTS

| | | |
|---|---|---|
| 6,192,380 B1 | 2/2001 | Light et al. |
| 7,254,569 B2 | 8/2007 | Goodman et al. |
| 7,441,181 B2 | 10/2008 | Yamada et al. |
| 8,601,109 B2 | 12/2013 | Johannsen |

(Continued)

FOREIGN PATENT DOCUMENTS

| | | |
|---|---|---|
| JP | 2006350767 A | 12/2006 |
| JP | 2015158715 A | 9/2015 |
| WO | 2015016524 A1 | 2/2015 |

OTHER PUBLICATIONS

Foreign Communication from Related Counterpart Application; PCT Patent Application No. PCT/KR2018/001084; International Search Report dated May 28, 2018; 3 pages.

(Continued)

*Primary Examiner* — Joseph W. King
*Assistant Examiner* — Amit Patel (57) ABSTRACT

A transaction method using an electronic device. The method comprises detecting, during an online transaction, one or more fields capable of being automatically filled by the electronic device, the one or more fields associated with the online transaction. The method further comprises obtaining, using a sensor, biometric information of a user of the electronic device, and verifying an identity of the user of the electronic device based on the obtained biometric information. Additionally, the method includes, in response to verifying the identity of the user of the electronic device based on the obtained biometric information: identifying personal information of the user to be automatically filled into the one or more fields based on the verified identity, and inserting the identified personal information into the one or more fields for the online transaction.

23 Claims, 8 Drawing Sheets

(56) References Cited

U.S. PATENT DOCUMENTS

| | | | |
|---|---|---|---|
| 10,169,321 B2* | 1/2019 | Trivedi | G06F 17/243 |
| 2001/0000535 A1* | 4/2001 | Lapsley | G06Q 20/0855 |
| | | | 705/64 |
| 2005/0204173 A1* | 9/2005 | Chang | H04L 9/3231 |
| | | | 726/19 |
| 2009/0132414 A1 | 5/2009 | Philliou et al. | |
| 2010/0293605 A1 | 11/2010 | Longobardi | |
| 2011/0247060 A1 | 10/2011 | Whitmyer, Jr. | |
| 2012/0136756 A1 | 5/2012 | Jitkoff et al. | |
| 2014/0258828 A1 | 9/2014 | Lymer et al. | |
| 2015/0074615 A1* | 3/2015 | Han | G06K 9/00033 |
| | | | 715/863 |
| 2016/0117682 A1* | 4/2016 | Srinath | G06Q 20/40145 |
| | | | 705/44 |

OTHER PUBLICATIONS

Foreign Communication from Related Counterpart Application; PCT Patent Application No. PCT/KR2018/001084; Written Opinion of the International Searching Authority dated May 28, 2018; 8 pages.

European Patent Office, "Supplementary European Search Report," Application No. EP18744035.9, dated Aug. 23, 2019, 10 pages.

Wikipedia, "Form (HTML)," last edited Aug. 14, 2019, 6 pages.

* cited by examiner

SYSTEM AND METHOD FOR SECURE PERSONAL INFORMATION RETRIEVAL

TECHNICAL FIELD

This disclosure relates generally to systems and methods used in and by electronic devices for identification of a user and a user's personal information. More specifically, an embodiment of this disclosure relates to secure credit card retrieval using fingerprint scanning.

BACKGROUND

A secure information retrieval scheme to access a communication device, an electronic device, application program, and online service such as a website offering banking has been recently emerged and evolved in a common market place. For the secure information retrieval scheme, a well-protected password would be identified and employed for a system and user. A great number of password management and maintenance programs have been deployed and adopted in the common market to assist with storing passwords. Recently, a browser plug-in program has been deployed to store and retrieve such secure information. For example, browser easy payment transactions by auto-filling secure information are available to offer a list of choices for known credit card information. However, the browser easy payment transaction may be potentially misused by user. Therefore, a secured information scheme with an auto-filling function to protect undesirable use or misuse of the credit card information needs to be developed using an authorization of the user.

SUMMARY

This disclosure provides a method and apparatus for secure credit card retrieval.

In one embodiment, a transaction method using an electronic device is provided. The method comprises detecting, during an online transaction, one or more fields capable of being automatically filled by the electronic device, the one or more fields associated with the online transaction. The method further comprises obtaining, using a sensor, biometric information of a user of the electronic device, and verifying an identity of the user of the electronic device based on the obtained biometric information. Additionally, the method includes, in response to verifying the identity of the user of the electronic device based on the obtained biometric information: identifying personal information of the user to be automatically filled into the one or more fields based on the verified identity, and inserting the identified personal information into the one or more fields for the online transaction.

In another embodiment, an apparatus of an electronic device is provided. The apparatus includes a memory electrically connected to at least one processor, the sensor electrically connected to the at least one processor, and the at least one processor. The at least one processor is configured to detect, during an online transaction, one or more fields capable of being automatically filled by the electronic device, the one or more fields associated with the online transaction, obtain, using the sensor, biometric information of a user of the electronic device, verify an identity of the user of the electronic device based on the obtained biometric information, and in response to verification of the identity of the user of the electronic device based on the obtained biometric information: identify personal information of the user to be automatically filled into the one or more fields based on the verified identity, and insert the identified personal information of the user into the one or more fields for the online transaction.

In yet another embodiment, a non-transitory computer readable medium comprising instructions performing a method is provided. The instruction comprises detecting, during an online transaction, one or more fields capable of being automatically filled by an electronic device, the one or more fields associated with the online transaction, obtaining, using a sensor, biometric information of a user of the electronic device, verifying an identity of the user of the electronic device based on the obtained biometric information, and in response to verifying the identity of the user of the electronic device based on the obtained biometric information: identifying personal information of the user to be automatically filled into the one or more fields based on the verified identity, and inserting the identified personal information of the user into the one or more fields for the online transaction.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 8, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
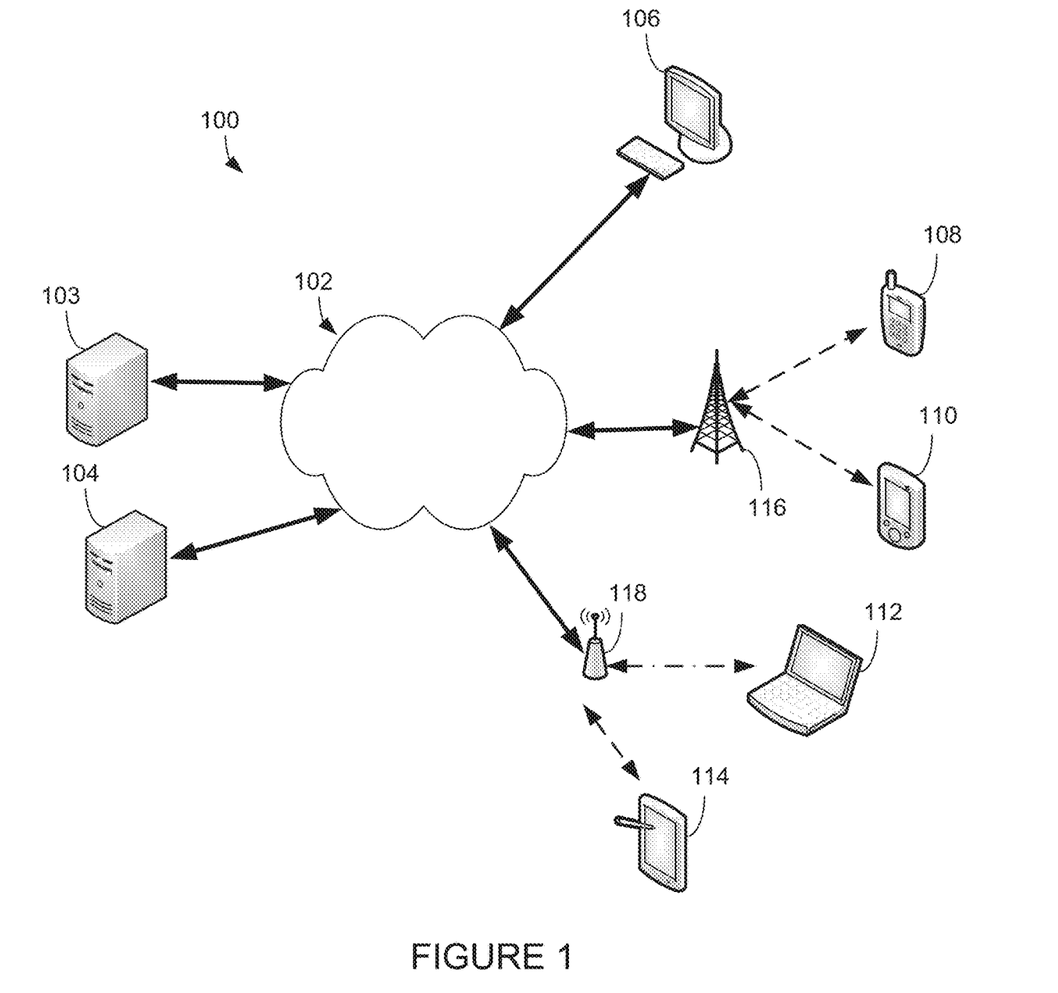
FIG. 1 illustrates an example communication system according to various embodiments of the present disclosure.
Figure 2:
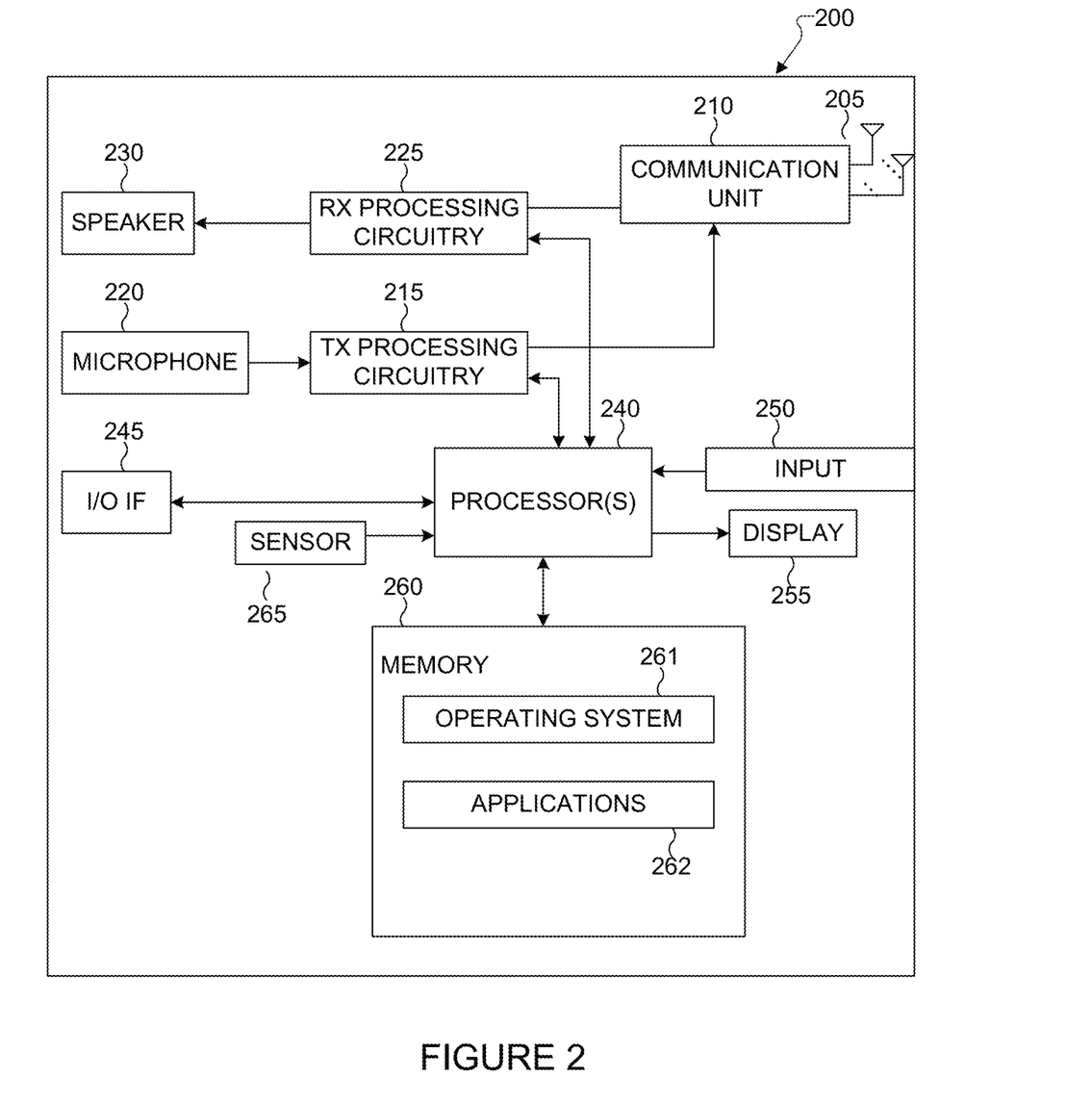
FIG. 2 illustrates an example electronic device according to various embodiments of the present disclosure.
Figure 3:
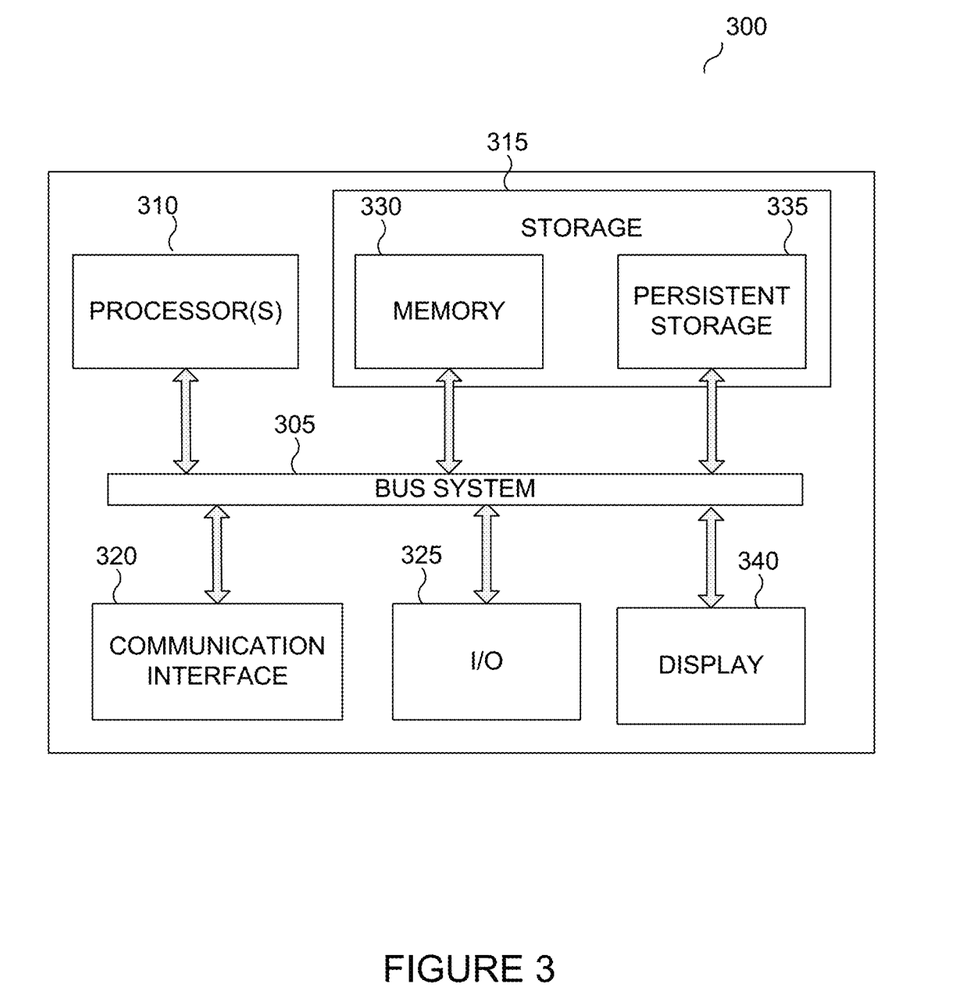
FIG. 3 illustrates an example computing system in a communication system according to various embodiments of the present disclosure.

The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example communication system 100 in which various embodiments of the present disclosure may be implemented. The embodiment of the communication system 100 shown in FIG. 1 is for illustration only. Other embodiments of the communication system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, or other information between network addresses. The network 102 may include one or more local area networks (LANs); metropolitan area networks (MANs); wide area networks (WANs); all or a portion of a global network, such as the Internet; or any other communication system or systems at one or more locations.

The network 102 facilitates communications between servers 103 and 104 and various electronic devices 106-114. Each server 103 and 104 includes any suitable computing or processing device that can provide computing services for one or more electronic devices. Each server 103 and 104 could, for example, include one or more processors, one or more memories storing instructions and data, and one or more network interfaces facilitating communication over the network 102. In some embodiments, one server 104 may store credit card information for retrieval and server 103 may process payment transactions.

Each electronic device 106-114 represents any suitable computing or communication device that interacts with at least one server or other computing device(s) over the network 102. In this example, the electronic devices 106-114 include electronic devices, such as, for example, a desktop computer 106, a mobile telephone or smartphone 108, a personal digital assistant (PDA) 110, a laptop computer 112, a tablet computer 114, a headset, a wearable device, smart watch, etc. However, any other or additional electronic devices could be used in the communication system 100.

In this example, some electronic devices 108-114 communicate indirectly with the network 102. For example, the electronic devices 108-110 communicate via one or more base stations 116, such as cellular base stations or eNodeBs. Also, the electronic devices 112-114 communicate via one or more wireless access points (APs) 118, such as IEEE 802.11 wireless APs, Bluetooth, and WiFi direct. Note that these are for illustration only and that each electronic device could communicate directly with the network 102 or indirectly with the network 102 via any suitable intermediate device(s) or network(s).

In some embodiments, the electronic devices 106-114 are capable of executing at least one application program to process browser ease payment transactions using automatic filling (auto-filling) of personal information of a user for an online transaction such as, for example, payment information (e.g., credit card information, such as for example, credit card number, card provider, security identifier, expiration date, billing address, etc.), address information, contact information, based on a web browsing, a mobile application, or any possible software/application, or a combination thereof. In some embodiments, the electronic devices 106-114 are capable of executing at least one application program to process browser ease payment transactions using auto-filling of personal information based on an integrated function including fingerprint scanning operation to provide secure credit card retrieval. In one example, the electronic devices 106-114 are capable of executing at least one application program to process browser ease payment transactions using auto-filling of personal information based on an integrated function including a fingerprint scanning device, voice recognition device, or other biometric devices for detecting biometric data of the user (e.g., fingerprint, voice, face, retina, iris etc.).

As described in more detail below, one or more of the electronic devices 106-114 include circuitry, programing, or a combination thereof, for executing at least one application program to process browser ease payment transactions using auto-filling of personal information based on an integrated function including fingerprinting scanning device, a voice recognition device, or other biometric devices for detecting biometric data of the user (e.g., fingerprint, voice, face, retina, iris, etc.).

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

FIG. 2 illustrates an example electronic device 200 according to embodiments of the present disclosure. The embodiment of the electronic device 200 illustrated in FIG. 2 is for illustration only, and the electronic devices 106-114 of FIG. 1 could have the same or similar configuration. However, electronic devices come in a wide variety of configurations, and FIG. 2 does not limit the scope of this disclosure to any particular implementation of an electronic device.

In some embodiments, the electronic device 200 comprises an internal electronic device and/or external device that are capable of executing at least one application program to process browser ease payment transactions using auto-filling of personal information. In some embodiments, the electronic device 200 comprises an internal electronic device and/or external device that are capable of executing at least one application program to process browser ease payment transactions using auto-filling credit card information based on an integrated function including fingerprint scanning operation to provide secure credit card retrieval. In another example, voice recognition function, and/or multi-modal biometric function (e.g., face, retina, and iris) may be used for the integrated function for browser ease payment transactions.

As shown in FIG. 2, the electronic device 200 includes communication unit 210, TX processing circuitry 215, a microphone 220, and receive (RX) processing circuitry 225. The communication unit 210 may include, for example, a RF transceiver, a Bluetooth transceiver, or a WiFi transceiver. The electronic device 200 also includes a speaker 230, a processor 240, an input/output (I/O) interface (IF) 245, an input device 250, a display 255, a memory 260, and a sensor 265. The memory 260 includes an operating system (OS) 261 and one or more applications 262.

The communication unit may 210 receive an incoming RF signal such as a Bluetooth signal or a WiFi signal. The communication unit 210 may down-convert the incoming RF signal to generate an intermediate frequency (IF) or baseband signal.

The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data (such as web data, e-mail, or interactive video game data) from the processor 240. The TX processing circuitry 215 encodes, multiplexes, and/or digitizes the outgoing baseband data to generate a processed baseband or IF signal. The communication unit 210 receives the outgoing processed baseband or IF signal from the TX processing circuitry 215 and up-converts the baseband or IF signal to an RF signal that is transmitted via the antenna 205.

The processor 240 can include one or more processors or other processing devices and execute the OS 261 stored in the memory 260 in order to control the overall operation of the electronic device 200. For example, the processor 240 could control the reception of forward channel signals and the transmission of reverse channel signals by the communication unit 210, the RX processing circuitry 225, and the TX processing circuitry 215 in accordance with well-known principles. In some embodiments, the processor 240 includes at least one microprocessor or microcontroller.

The processor 240 is also capable of executing other processes and programs that are stored in the memory 260, for example the processor 240 processes diagnostic data for the eNBs 116 and 118 in a wireless communication network.

The sensor 265 senses at least one external input including biometric information of user. For example, the sensor 265 may be or include a fingerprint scanner, an eye scanner (e.g., such as a camera), etc. The sensor 265 may be integrated into the electronic device 200 or may be a discrete component that communicates with the electronic device 200 to provide the biometric data for validation of the user.

In some embodiments, the processor 240 is capable of executing at least one application program and/or circuitry to process browser ease payment transactions using auto-filling credit card information. In some embodiments, the processor 240 is capable of executing at least one application program and/or circuitry to process browser ease payment transactions using auto-filling credit card information based on an integrated function including fingerprint scanning operation to provide secure credit card retrieval.

The processor 240 can move data into or out of the memory 260 as required by an executing process. In some embodiments, the processor 240 is configured to execute the applications 262 based on the OS 261 or in response to signals received from eNBs or an operator. The processor 240 is also coupled to the I/O interface 245, which provides the electronic device 200 with the ability to connect to other devices, such as laptop computers and handheld computers. The I/O interface 245 is the communication path between these accessories and the processor 240.

In some embodiments, the processor 240 is capable of detecting, during an online transaction, one or more fields capable of being automatically filled by the electronic device, the one or more fields associated with the online transaction, obtaining, using a sensor, biometric information of a user of the electronic device, verifying an identity of the user of the electronic device based on the obtained biometric information, identifying a set of personal information of the user to be automatically filled into the one or more fields based on the verified identity, and inserting the identified set of personal information of the user into the one or more fields for the online transaction. For example, the biometric information may be received from the sensor 265 as discussed above. In another example, the processor may receive and process voice data, via microphone 220, to verify an identity of the user of the electronic device 200.

In some embodiments, the processor 240 is capable of determining whether one or more sets of personal information are pre-stored in a memory accessible by the electronic device, retrieving the one or more sets of personal information from the memory, and displaying a list including the one or more sets of personal information of the user on the one or more fields associated with the online transaction in response to verifying the identity of the user. In one example, the one or more fields are the fields that may be automatically filled (e.g., auto-filling) with the one or more sets of personal information of the user. In another example, the one or more fields are the fields that have been filled with the one or more sets of personal information of the user.

In some embodiments, the processor 240 is capable of denying automatic filling of the one or more sets of personal information of the user into the one or more fields associated with the online transaction when verification of the identity of the user of the electronic device based on the obtained biometric information fails.

In some embodiments, the processor 240 is capable of displaying a list including the set of personal information of the user in response to verifying the identity of the user, wherein identifying the set of personal information of the user to be automatically filled into the one or more fields comprises identifying the set of personal information of the user to be automatically filled into the one or more fields based on receipt of a selection from the list.

In some embodiments, the processor 240 is capable of requesting entry of a new set of personal information of the user in accordance with the obtained biometric information of the user, and storing the new set of personal information in a memory accessible by the electronic device, wherein verification of the identity of the user of the electronic device is performed based on the obtained biometric information of the user before use of the new set of personal information in the online transaction.

In some embodiments, the processor 240 is capable of detecting denying automatic filling of the one or more sets of personal information of the user into the one or more fields associated with the online transaction, requesting an entry of a new set personal information and new biometric information of the user, wherein verification of the identity of the user of the electronic device is performed based on the requested new biometric information of the user, and storing the new set of personal information in a memory accessible by the electronic device. Wherein the online transaction is a payment transaction and the set of personal information of the user comprises credit card information for one or more credit card accounts of the user.

The processor 240 is also coupled to the input device 250 and the display 255. The operator of the electronic device 200 can use the input device 250 to enter data into the electronic device 200. In some embodiments, the input device 250 comprises a circuitry and/or program to recognize fingerprint scanning input from a user and/or user device.

The display 255 may be a liquid crystal display, light emitting diode display, or other display capable of rendering text and/or at least limited graphics, such as from web sites. In some embodiments, the processor 240 is configured to transmit diagnostic data to the eNBs 116 and 118 in a wireless communication network.

The memory 260 is coupled to the processor 240. Part of the memory 260 could include a random access memory (RAM), and another part of the memory 260 could include a Flash memory or other read-only memory (ROM). In some embodiments, the memory 260 may store a program code, that when executed by at least one controller/processor 240, causes the at least one processor to transmit diagnostic data to the eNBs 116 and 118 in a wireless communication network.

In some embodiments, the memory 260 may store at least one application program code, that when executed by at least one processor 240 (e.g., controller), causes that at least one processor to process browser ease payment transactions using auto-filling credit card information. For example, the one or more of applications 262 may include a browser for providing an online session including a payment transaction. In another example, one or more of applications 262 may be a mobile application that can be used to complete a payment transaction. The processor 240 can provide the personal information for use by the application 262 during the payment transaction.

Although FIG. 2 illustrates one example of electronic device 200, various changes may be made to FIG. 2. For example, various components in FIG. 2 could be combined, further subdivided, or omitted and additional components could be added according to particular needs. As a particular example, the processor 240 could be divided into multiple processors, such as one or more central processing units (CPUs) and one or more graphics processing units (GPUs). In another example, the electronic device may include an antenna or a set of multiple antennas. Also, while FIG. 2 illustrates the electronic device 200 configured as a mobile telephone or smartphone, electronic devices could be configured to operate as other types of mobile, stationary devices, or electronic devices providing browser ease payment transactions using auto-filling credit card information based on an integrated function including fingerprint scanning operation to provide secure credit card retrieval.

FIG. 3 illustrates an example computing system 300 according to embodiments of the present disclosure. The embodiment of the computing system 300 shown in FIG. 3 is for illustration only. Other embodiments of the computing system 300 could be used without departing from the scope of this disclosure.

As illustrated in FIG. 3, a computing system 300 could represent the servers 103 and/or 104 in FIG. 1, one or more of the electronic devices 106-114 in FIG. 1, a network node, a client computer, or any other type of computing system. For example, in some embodiments, the computing system 300 may store personal information of the user, such as, for example, payment information, address information, contact information, etc. for retrieval by the electronic device 200 during an online transaction. In some embodiments, the computing system 300 facilitates an online session with the electronic device 200 during which personal information of the user is provided to complete a payment transaction. In some embodiments, the computing system 300 may store the user's biometric information to compare with obtained biometric data in validating the user's identity.

As shown in FIG. 3, the computing system 300 includes a bus system 305, which supports communication between at least one processor 310, at least one storage 315, at least one communication interface 320, at least one input/output (I/O) unit 325, and at least one display 340.

The processor 310 executes instructions that may be loaded into a memory 330. The processor 310 may include any suitable number(s) and type(s) of processors or other devices in any suitable arrangement. Example types of the processor 310 include microprocessors, microcontrollers, digital signal processors, field programmable gate arrays, application specific integrated circuits, discreet circuitry, and video stream processors.

The memory 330 and a persistent storage 335 are examples of storage devices 315, which represent any structure(s) capable of storing and facilitating retrieval of information (such as data, program code, and/or other suitable information on a temporary or permanent basis). The memory 330 may represent a random access memory or any other suitable volatile or non-volatile storage device(s). The persistent storage 335 may contain one or more components or devices supporting longer-term storage of data, such as a read only memory, hard drive, flash memory, or optical disc. The display 340 may include a panel, a hologram device, or a projector to display any object (such as a text, a video, an image, graphic and/or other suitable information).

The communication interface 320 supports communications with other systems or devices. For example, the communication interface 320 could include a network interface card or a wireless transceiver facilitating communications over the network 102. The communication interface 320 may support communications through any suitable physical or wireless communication link(s). In some embodiments, the communication interface 320 supports a communication with other system or an electronic device 200 to facilitate payment transactions using auto-filled personal information.

The I/O unit 325 allows for input and output of data. For example, the I/O unit 325 may provide a connection for user input through a keyboard, mouse, keypad, touch screen, fingerprint scanning device, voice recognition device, multimodal biometric device (e.g., face, iris etc.), or other suitable input device. The I/O unit 325 may also send output to a display, printer, or other suitable output device.

Figure 4:
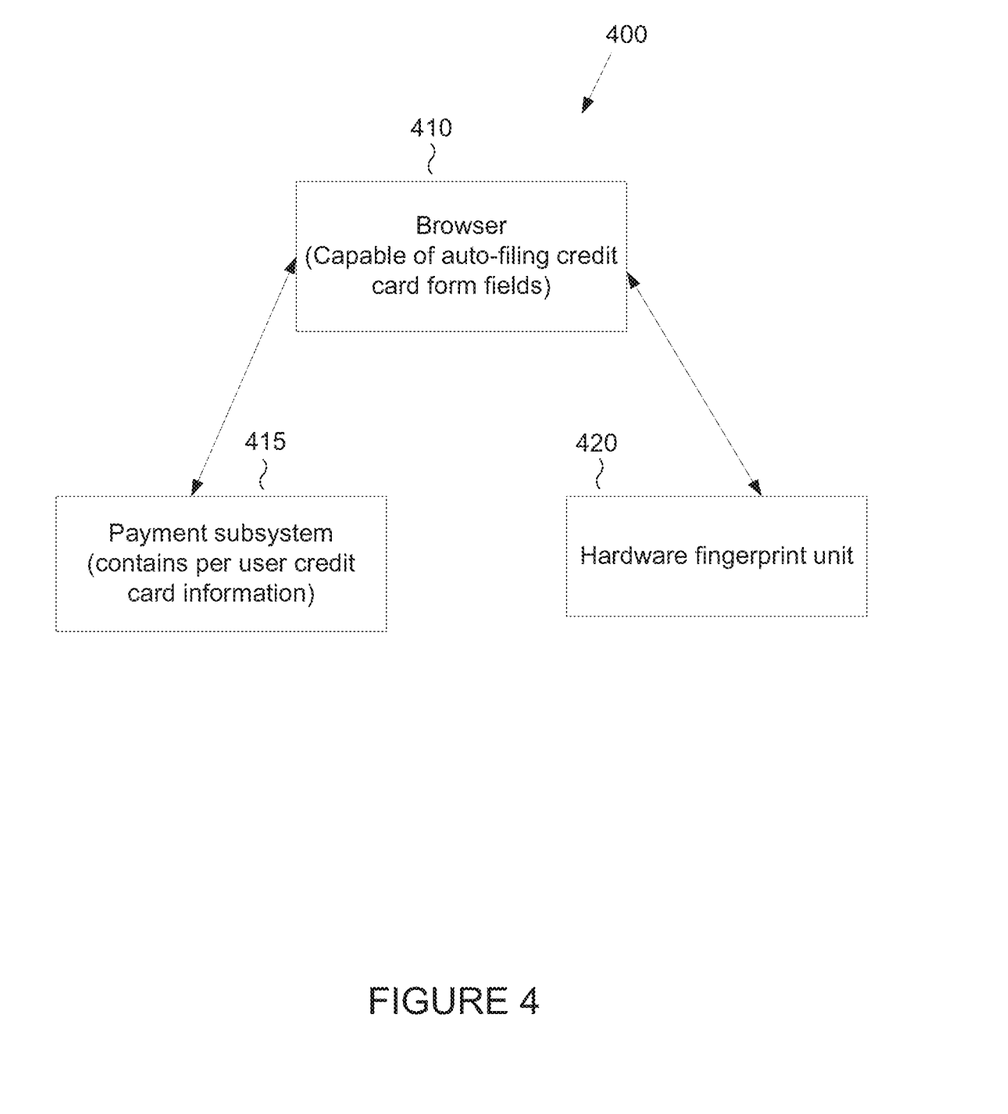
FIG. 4 illustrates an example system architecture of a secure payment information retrieval system according to various embodiments of the present disclosure.

FIG. 4 illustrates an example architecture system of a secure payment information retrieval system 400 according to various embodiments of the present disclosure. The embodiment of the architecture of a secure payment information retrieval system 400 shown in FIG. 4 is for illustration only. Other embodiments of the architecture of a secure credit card retrieval system 400 could be used without departing from the scope of this disclosure.

As shown in FIG. 4, the architecture system of the secure credit card retrieval system 400 comprises a browser 410, a payment subsystem 415, and a hardware fingerprint unit 420. In this illustrative example, a browser 410, such as a web browser or other type of application, is used to conduct an online transaction. In some embodiments, a mobile application or any usable software may be used for the online transaction. The browser 410 (mobile application or any usable software) is capable of detecting and auto-filling credit card form fields. For example, the browser 410 may be run on electronic device 200.

The browser 410 is operably connected with a hardware fingerprint unit 420. The browser 410 transmits an authentication request to the hardware unit of fingerprint unit 420 and receives fingerprint information from the hardware unit of fingerprint unit 420. The received fingerprint information from the hardware of fingerprint unit 420 may be compared with pre-stored user fingerprint information to authenticate the user during the online transaction. For example, the comparison may be performed by the electronic device 200 running the browser 410. In another example, the browser 410 may send the fingerprint information to the payment subsystem 415 for comparison to be performed by the payment subsystem 415. The browser 410 is operably connected with a payment subsystem 415. The payment subsystem 415 includes individual user's payment information. For example, the payment subsystem 415 may store payment information for one or more credit cards of the user. In some embodiments, the payment subsystem 415 may be part of the electronic device 200 of the user. In other embodiments, the payment subsystem 415 is directly or indirectly connected to the electronic device 200, such as, for example, computing system 300. In other embodiments, the functionality of the payment subsystem 415 may be divided among components internal to and external to the electronic device 200.

The browser 410 sends the user's fingerprint information received from the hardware fingerprint unit 420 to the payment subsystem 415. The payment subsystem 415 authenticates the user finger print using the pre-stored fingerprint information of the user. The payment subsystem 415 then sends information including a list of credit card information of the user to the browser 410. The browser 410 then auto-fills the credit card fields with some or all of the received payment information. For example, if multiple sets of payment information are returned by the payment subsystem 415 (e.g., multiple different credit cards each with its own associated credit card information), the browser 410 may have the list for selection of one of the sets and auto-fill the selected set of payment information. In another example, the browser 410 may auto-fill using information for a predetermined preferred credit card.

In various embodiments, the system 400 facilitates storage of personal information and biometric information of the user for auto-filling during a future online transaction. For example, if the system 400 does not have payment, address, and/or biometric information of the user and/or if the user desires to include additional personal information for auto-filling, the system 400 may request (e.g., via browser 410 and/or electronic device 200) the personal information and biometric information of the user. For example, the electronic device 200 may request a new input of biometric information to be associated each new set of personal information of the user when receiving and storing the new set of personal information. This newly received and stored pairs of biometrics and personal information can later be used by the system to improve user convenience and security during a future online transaction. While the example above discusses use of a hardware fingerprint unit 420 to generate fingerprint data as the biometric information of the user to provide secure retrieval of personal information, the present disclosure is not limited thereto and any type of biometric sensor and biometric infuriation may be utilized in any of the embodiments of the present disclosure in lieu of or in addition to fingerprint data to provide secure personal information retrieval.

Figure 5:
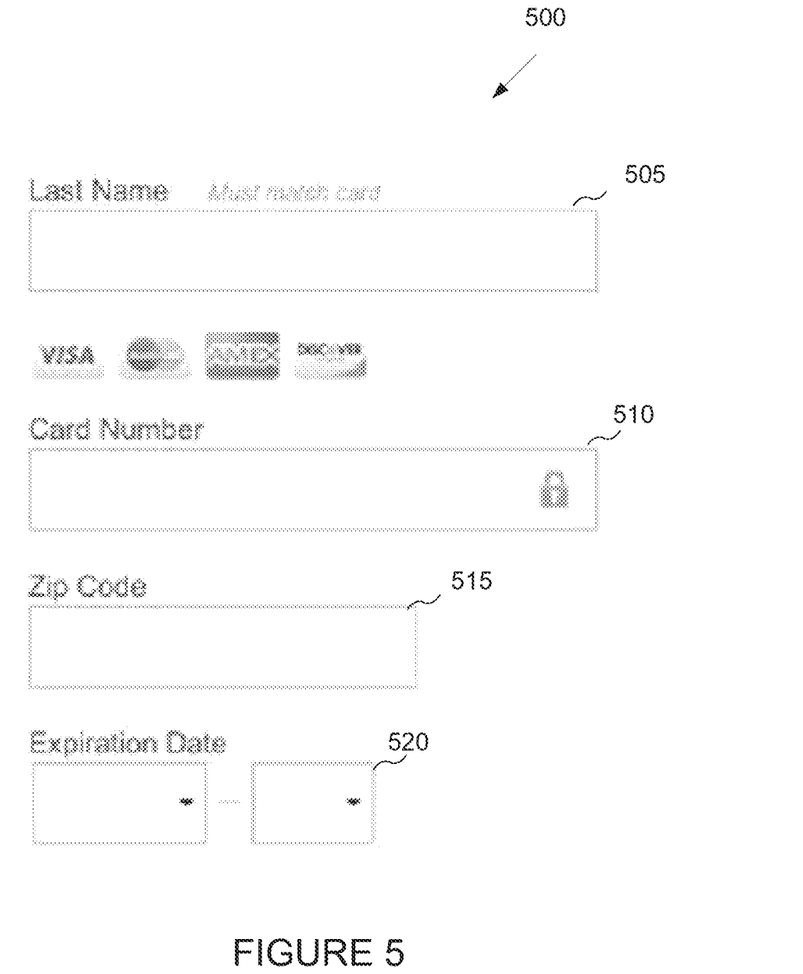
FIG. 5 illustrates an example page including fields for auto-filling of payment information according to various embodiments of the present disclosure.

FIG. 5 illustrates an example page 500 including fields for auto-filling of payment information according to various embodiments of the present disclosure. The embodiment of the page for credit card information identification 500 shown in FIG. 5 is for illustration only. Other embodiments of the page 500 including fields for auto-filling of payment information could be used without departing from the scope of this disclosure.

In this illustrative example, page 500 is a page from a browser or mobile application used during a payment transaction. As shown in FIG. 5, the page 500 includes a last name field 505, a card number field 510, a ZIP code field 515, and an expiration date field 520. As shown in FIG. 5, the browser or mobile application displays the page 500, for example, on a display of the electronic device 200 including the last name field 505, the card number field 510, the ZIP code field 515, and the expiration date field 520.

Figure 6:
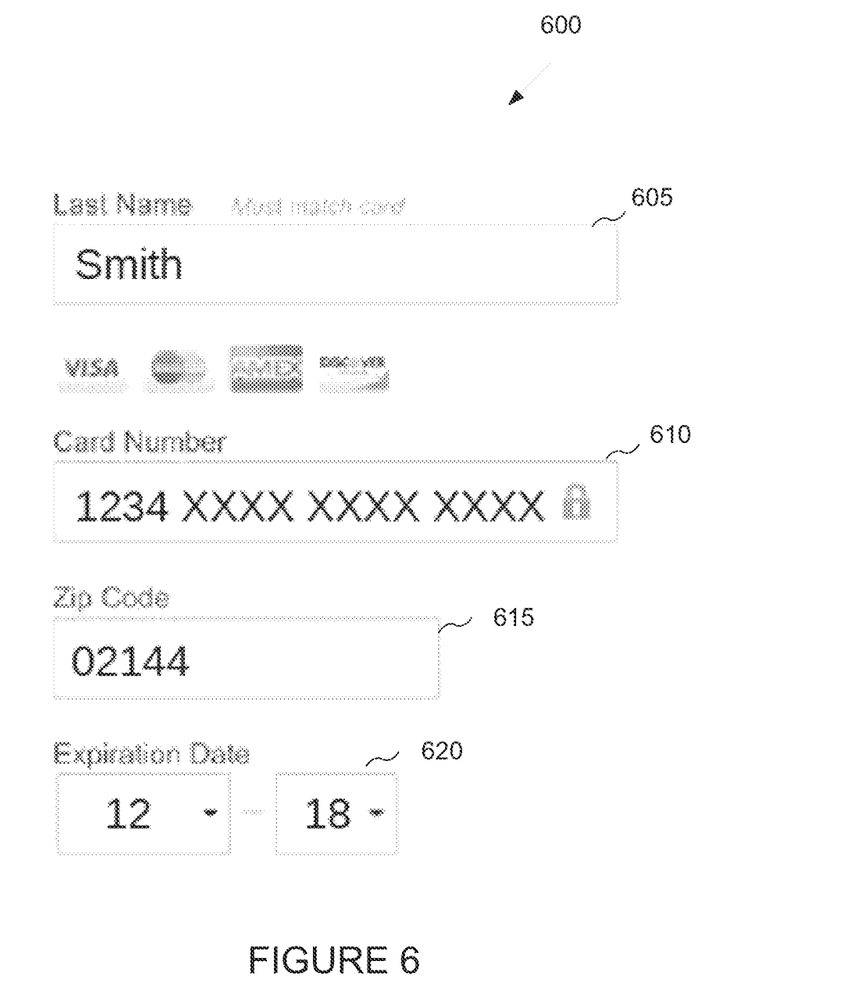
FIG. 6 illustrates an example page including auto-filled payment information according to various embodiments of the present disclosure

FIG. 6 illustrates an example page 600 including auto-filled payment information according to various embodiments of the present disclosure. The embodiment of the page 600 including auto-filled payment information shown in FIG. 6 is for illustration only. Other embodiments of the page 600 could be used without departing from the scope of this disclosure.

In this illustrative example, page 600 is a page from a browser or mobile application used during a payment transaction including auto-filled information. For example, this auto-filled information may be auto-filled using the secure auto-filling techniques discussed above-with regard to system 400 in FIG. 4. As shown in FIG. 6, the page 600 for auto-filling of credit card information includes a last name field 605, a card number field 610, a ZIP code field 615, and an expiration date field 620. In particular, the browser or mobile application of the electronic device 200 displays auto-filled information with the last name field 605 (e.g., Smith), the card number field 610 (e.g., 1234XXXX . . . ), the ZIP code field 615 (e.g., 02144), and the expiration date field 620 (e.g., 12 and 18).

In some embodiments, a browser (e.g., 410) may mask a real credit card number retrieved from the payment subsystem (e.g., 415) in the card number field 610 only for displaying the page 600. In some embodiments, a browser (e.g., 410) unmasks and provides full permanent account number (PAN) through Javascript/document object model (DOM) application program interfaces (APIs) for improving privacy and security for the card number field 610.

In some embodiments, a user may use auto-filling and/or auto-complete information that is specified. As shown in the examples illustrated in FIGS. 5 and 6, a list of fields for credit card information may be shown for the user. In one example, a browser may offer to autofill credit card information on a suitable web page. In such example, the user may allow to decline the auto-filling operation provided by the web page. In such example, if the user accepts the auto-filling operation, the fingerprint of the user is scanned via a sensor in an electronic device of the user. In such example, if the user is authorized, the browser shows at least one user's known credit card to verify the use of the credit card for the online transaction. In such example, the user chooses at least one credit card from the user's known credit card for auto-filling. The credit card information of the chosen credit card may be automatically filled into the last name field 605, the card number field 610, the ZIP code field 615, and the expiration date field 620 as illustrated in FIG. 6.

Figure 7:
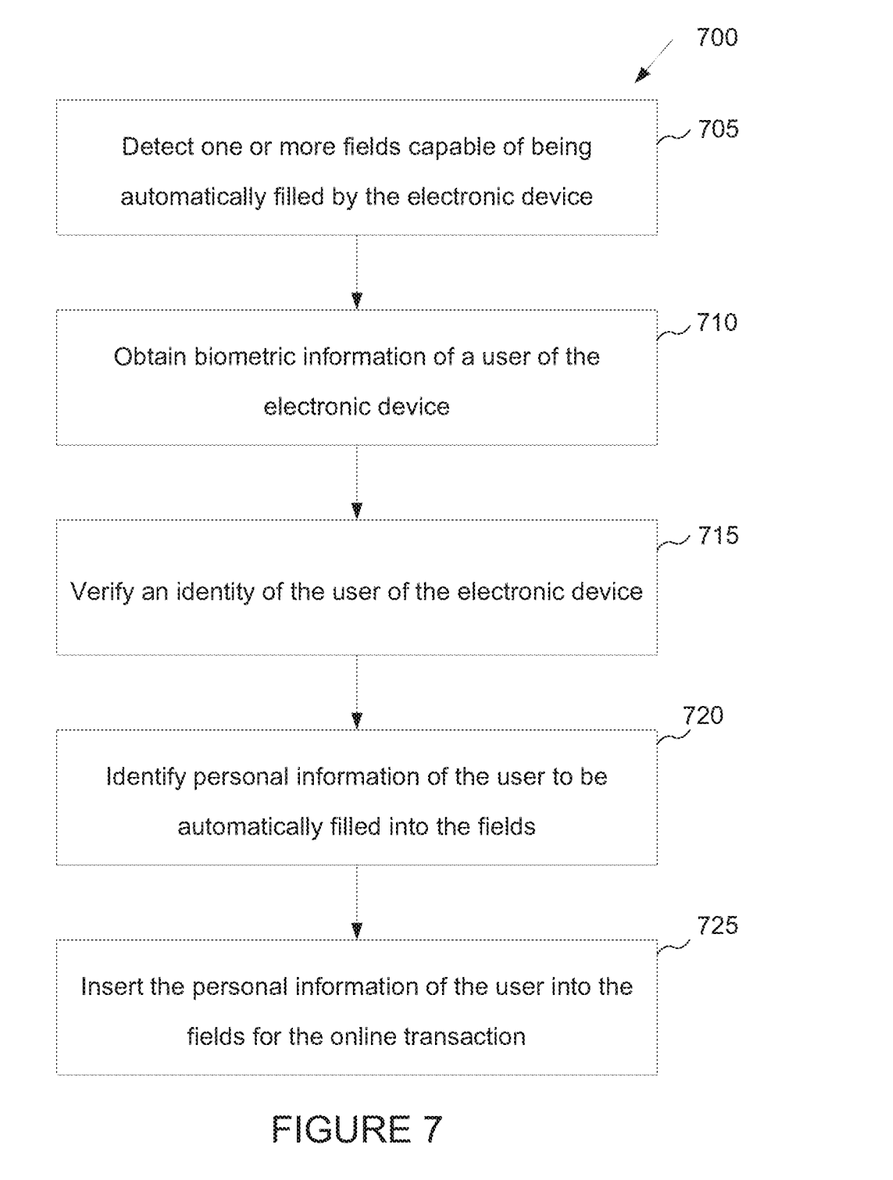
FIG. 7 illustrates a flowchart of a process for a secure personal information retrieval according to various embodiments of the present disclosure.

FIG. 7 illustrates a flowchart of a process 700 for secure personal information retrieval according to various embodiments of the present disclosure. For example, the process 700 may be performed by the electronic device 200 in FIG. 2 in communication with a server. The embodiment of the process 700 for the secure personal information retrieval shown in FIG. 7 is for illustration only. Other embodiments of the method 700 for the secure personal information retrieval could be used without departing from the scope of this disclosure.

As shown in FIG. 7, the electronic device 200 detects, at step 705, one or more fields capable of being automatically filled by the electronic device 200 during an online transaction operation at the electronic device. For example, the electronic device 200 may detect an identifier of the field in markup text (e.g., a hyper-text markup language (HTML) webpage). The one or more fields detected by the electronic device 200 are used during the online transaction performed at the electronic device 200. For example, the online transaction may be a payment transaction and the set of personal information of the user may be payment information, such as credit card information for one or more credit card accounts of the user.

The electronic device 200 obtains, at step 710, biometric information of a user of the electronic device 200 using a sensor. For example, the sensor at step 710 may be an electrical sensor, an optical sensor, a microphone, or any type of sensor that may accept any input including the user's biometric information (e.g., fingerprint, voice, facial characteristics, retina, iris, etc.). This sensor may be located on the electronic device 200 or may be external to but operably connected to the electronic device 200. In some embodiments, multiple different types of this biometric information may be obtained and used to verify a user's identity for additional security.

Thereafter, the electronic device 200 verifies, at step 715, an identity of the user of the electronic device 200 based on the obtained biometric information via the sensor. For example, in one embodiment, the electronic device 200 compares the obtained biometric information with pre-stored and previously obtained biometric information of the user that is stored on the electronic device. In another embodiment, the electronic device 200 may send obtained biometric information to another trusted device, for example, the computing system 300, that stores previously obtained biometric information of the user for comparison. The computing system 300 may then perform the comparison and send an indication of the verification or lack thereof of the identity of the user.

Next, the electronic device 200 identifies, at step 720, a set of personal information of the user to be automatically filled into the one or more fields based on the verified identity. For example, assuming that the identity of the user is verified at step 715, the electronic device 200 may determine payment information to be auto-filled into the fields. If the identity of the user is not verified at step 715, then the electronic device 200 will not perform auto-filling thus preventing non-verified users from gaining access to the personal information during the online transaction. In step 720, the electronic device 200 may store the one or more sets of personal information for retrieval from the memory. In another example, the electronic device 200 may obtain the one or more sets of personal information from a remote device such as server 300.

In one embodiment, the electronic device 200 may identify multiple sets of personal information of the user. For example, the user may have multiple different credit cards, addresses, or other sets of personal information pre-stored for auto-filling. The electronic device 200, upon recognizing the existence of multiple sets of personal information of the user can display a list for the multiple sets of personal information. The electronic device 200 can then automatically fill the one or more fields with one set of personal information from the list based on receipt of a selection from a list.

Thereafter, the electronic device 200 inserts, at step 725, the identified set of personal information of the user into the one or more fields for the online transaction. Thereafter, the electronic device 200 can complete the online transaction using the auto-filled information providing convenience for the user while increasing the security for the personal information of the user.

In some embodiments, the electronic device 200 may request entry of a new set of personal information of the user in accordance with the obtained biometric information of the user and store the new set of personal information in a memory accessible by the electronic device 200. In one embodiment, the verification of the identity of the user of the electronic device may be performed based on the obtained biometric information of the user before use of the personal information in the online transaction.

In some embodiments, the electronic device 200 detects, at step 705, denial of automatic filling of the personal information of the user into the one or more fields associated with the online transaction, requests an entry of a new set of personal information and new biometric information of the user. In this embodiment, future verification of the identity of the user of the electronic device 200 for auto-filling is performed based on the requested and new biometric information of the user and storage of this new set of personal information in a memory accessible by the electronic device 200.

Figure 8:
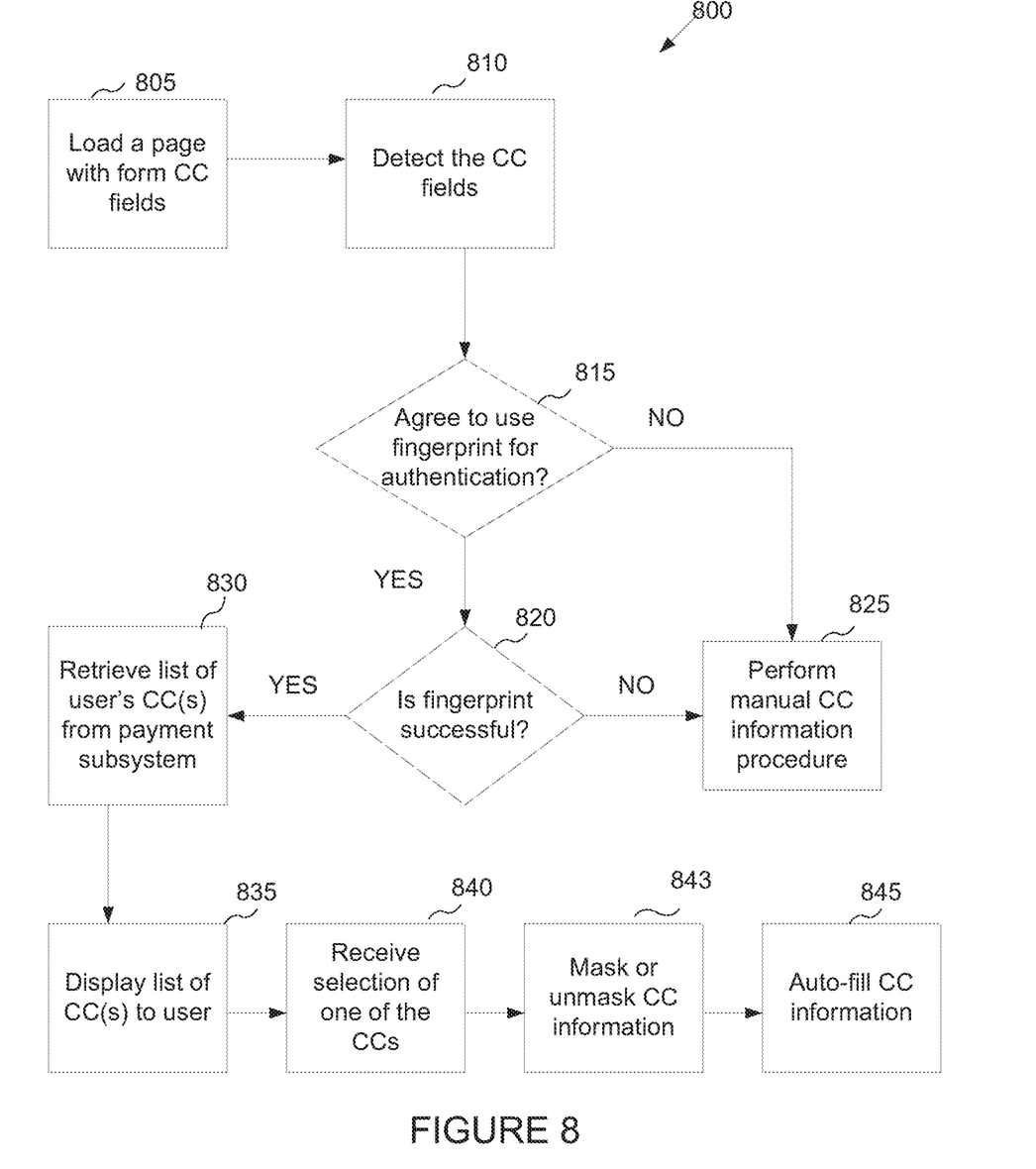
FIG. 8 illustrates an example flowchart of process for a secure credit card retrieval and auto-fill according to various embodiments of the present disclosure.

FIG. 8 illustrates an example flowchart of process 800 for a secure credit card retrieval and auto-fill according to various embodiments of the present disclosure. For example, the process 800 may be performed by the electronic device 200 in FIG. 2 in communication with a server. The embodiment of process 800 for a secure credit card retrieval and auto-fill shown in FIG. 8 is for illustration only. Other embodiments of the process 800 for a secure credit card retrieval and auto-fill could be used without departing from the scope of this disclosure.

As shown in FIG. 8, the electronic device 200 loads a web page during an online transaction that includes a form including credit card fields for an online transaction at step 805. The electronic device 200 detects the credit card fields for the online transaction at step 810. In one example, the electronic device 200 may use a website that follows the Specification determined by auto-filling functions in HTML standard Specification in order to detect the credit card field at step 810. In another example, the electronic device 200 may use browser reading name, identification (ID) or a value field of input tags to check if the input field intended to be a credit card field in order to detect credit card fields at step 810. In yet another example, the electronic device may use a browser that checks an order of the input fields (e.g., credit card number, credit card name, expiry date or card verification value (CVV) field) to identify whether a webpage form is a checkout form.

At step 815, if receiving user agreement to use a fingerprint for authentication, the electronic device 200 receives data from an input of the user's fingerprint. If not receiving user agreement to use a fingerprint for authentication, the electronic device 200 may proceed with a manual credit card entry procedure for completing the online transaction.

At step 820, the electronic device 200 determines whether the user's fingerprint is successful. For example, the electronic device determines whether the identity of the user is verified based on the fingerprint input. If not successful, the electronic device 200 may proceed with a manual credit card entry procedure for completing the online transaction at step 825.

If the user's fingerprint is successfully authenticated at step 820, the electronic device 200 retrieves a list of the user's credit card information that is retrieved from a payment subsystem at step 830. At step 835, the electronic device 200 displays the list of credit card information to the user. The electronic device 200 receives a selection at least one of credit card information from the list at step 840. At step 843, a browser (e.g., 410) may mask a real credit card number retrieved from the payment subsystem (e.g., 415) in the card number field only for displaying the page. In one embodiment, at step 843, a browser (e.g., 410) unmasks and provides full permanent account number (PAN) through Javascript/document object model (DOM) application program interfaces (APIs) for improving privacy and security for the card number field.

At step 845, the electronic device 200 automatically fills the user's credit card information into the credit card fields for completion of the online transaction.

Although FIGS. 7 and 8 illustrate examples of processes for secure personal information retrieval and secure credit card retrieval and auto-fill, respectively, various changes could be made to FIGS. 7 and 8. For example, while shown as a series of steps, various steps in each figure could overlap, occur in parallel, occur in a different order, or occur multiple times.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A transaction method using an electronic device, the method comprising:
   detecting, by the electronic device, multiple entry fields in a financial application corresponding to an online transaction;
   in response to the multiple entry fields being detected, obtaining, by a sensor of the electronic device, biometric information of a user of the electronic device, wherein the sensor senses at least one external physical biometric input by the user;
   verifying the user of the electronic device by comparing the obtained biometric information with pre-stored biometric data of the user; and
   in response to the user being verified based on the obtained biometric information, electronically auto-filling the multiple entry fields by:
      identifying, by the electronic device, multiple sets of personal information of the user, wherein each set of the multiple sets of personal information of the user comprises multiple personal information entries that are used for the online transaction, respectively,
      displaying, by the electronic device, a list of the multiple sets of personal information of the user,
      receiving, from a user, a selection of a set of personal information from the list, and
      automatically inserting, by the electronic device, the personal information entries in the set of personal information corresponding to the received selection into the multiple entry fields for the online transaction.

2. The method of claim 1, further comprising:
   determining whether the multiple sets of personal information are pre-stored in a memory accessible by the electronic device; and
   retrieving the one or more sets of personal information from the memory.

3. The method of claim 1, further comprising denying automatic inserting of the personal information entries into the multiple entry fields associated with the online transaction in response to the user of the electronic device not being verified based on the obtained biometric information.

4. The method of claim 1, wherein displaying the list of the multiple sets of the personal information of the user further comprises:
   masking credit card information that is retrieved from a payment subsystem; and
   unmasking a full permanent account number through an application program interface.

5. The method of claim 1, further comprising:
   requesting entry of a new set of personal information of the user in accordance with the obtained biometric information of the user; and
   storing the new set of personal information in a memory accessible by the electronic device, wherein verifying the user of the electronic device is performed based on the obtained biometric information of the user before use of the new set of personal information in the online transaction.

6. The method of claim 1, wherein each set of the multiple sets of personal information corresponds to a credit card account including multiple credit card information entries.

7. The method of claim 1, wherein the sensor comprises one of a fingerprint sensor or an optical sensor.

8. The method of claim 1, wherein detecting the multiple entry fields comprises reading, on a browser, at least one of name field, identification field, or a value field of input tags to detect multiple fields.

9. An electronic device comprising:
a memory electrically connected to at least one processor;
a sensor electrically connected to the at least one processor; and
the at least one processor configured to:
detect, by the electronic device, multiple entry fields in a financial application corresponding to an online transaction;
in response to the multiple entry fields being detected, obtain, using the sensor, biometric information of a user of the electronic device, wherein the sensor senses at least one external physical biometric input by the user;
verify the user of the electronic device by comparing the obtained biometric information with pre-stored biometric data of the user; and
in response to the user being verified based on the obtained biometric information, electronically auto-filling the multiple entry fields by:
identifying multiple sets of personal information of the user, wherein each set of the multiple sets of personal information of the user comprises multiple personal information entries that are used for the online transaction, respectively,
displaying a list of the multiple sets of personal information of the user;
receiving, from a user, a selection of a set of personal information from the list, and
automatically inserting the personal information entries into the multiple entry fields for the online transaction based on the selection of the set of personal information from the list.

10. The electronic device of claim 9, wherein the at least one processor is further configured to:
determine whether multiple sets of personal information are pre-stored in the memory accessible by the electronic device; and
retrieve the multiple sets of personal information from the memory.

11. The electronic device of claim 9, wherein the at least one processor is further configured to deny automatic insertion of the personal information entries into the multiple entry fields associated with the online transaction in response to the user of the electronic device not being verified based on the obtained biometric information.

12. The electronic device of claim 9, wherein the at least one processor is further configured to:
mask credit card information that is retrieved from a payment subsystem; and
unmask a full permanent account number through an application program interface.

13. The electronic device of claim 9, wherein the at least one processor is further configured to:

request entry of a new set of personal information of the user in accordance with the obtained biometric information of the user; and
store the new set of personal information in the memory accessible by the electronic device,
wherein verification of the user of the electronic device is performed based on the obtained biometric information of the user before use of the new set of personal information in the online transaction.

14. The electronic device of claim 9, wherein each set of the multiple sets of personal information corresponds to a credit card account including multiple credit card information entries.

15. The electronic device of claim 9, wherein the sensor comprises one of a fingerprint sensor or an optical sensor.

16. The electronic device of claim 9, wherein the at least one processor is further configured to read, on a browser, at least one of name, identification, or a value field of input tags to detect multiple fields.

17. A non-transitory computer readable medium, comprising instructions, that when executed by at least one processor, perform a method comprising:
detecting multiple entry fields in a financial application corresponding to an online transaction;
in response to the multiple entry fields being detected, obtaining, using a sensor, biometric information of a user of an electronic device, wherein the sensor senses at least one external physical biometric input by the user;
verifying the user of the electronic device by comparing the obtained biometric information with pre-stored biometric data of the user; the obtained biometric information;
in response to the user being verified based on the obtained biometric information, electronically auto-filling the multiple entry fields by:
identifying, by the electronic device, multiple sets of personal information of the user, wherein each set of the multiple sets of personal information of the user comprises multiple personal information entries that are used for the online transaction, respectively,
displaying, by the electronic device, a list of the multiple sets of personal information of the user,
receiving, from a user, a selection of a set of personal information from the list, and
automatically inserting, by the electronic device, the personal information entries into the multiple entry fields for the online transaction based on the selection of the set of personal information from the list.

18. The non-transitory computer readable medium of claim 17, further comprising instructions, that when executed by the at least one processor, perform the method comprising:
determining whether multiple sets of personal information are pre-stored in a memory accessible by the electronic device; and
retrieving the multiple sets of personal information from the memory.

19. The non-transitory computer readable medium of claim 17, further comprising instructions that when executed by the at least one processor, perform the method comprising, denying automatic inserting of the personal information entries into the multiple entry fields associated with the online transaction in response to the user of the electronic device not being verified based on the obtained biometric information.

20. The non-transitory computer readable medium of claim 17, further comprising instructions that when executed by the at least one processor, perform the method comprising:
- masking credit card information that is retrieved from a payment subsystem; and
- unmasking a full permanent account number through an application program interface.

21. The non-transitory computer readable medium of claim 17, further comprising instructions that when executed by the at least one processor, perform the method comprising:
- requesting entry of a new set of personal information of the user in accordance with the obtained biometric information of the user; and
- storing the new set of personal information in a memory accessible by the electronic device,
- wherein verifying the user of the electronic device is performed based on the obtained biometric information of the user before use of the new set of personal information in the online transaction.

22. The non-transitory computer readable medium of claim 17, wherein each set of the multiple sets of personal information corresponds to a credit card account including multiple credit card information entries.

23. The non-transitory computer readable medium of claim 17, further comprising instructions that when executed by the at least one processor, perform the method comprising reading, on a browser, at least one of name field, identification field, or a value field of input tags to detect multiple fields.

* * * * *